United States Patent [19]

Grant

[11] Patent Number: 4,662,014
[45] Date of Patent: May 5, 1987

[54] HEADMAT

[76] Inventor: Arie L. Grant, 1601 E. 35th St., Savannah, Ga. 31404

[21] Appl. No.: 809,390

[22] Filed: Mar. 17, 1986

[51] Int. Cl.⁴ .............................................. A47G 9/00
[52] U.S. Cl. ......................................... 5/501; 5/484; 5/502
[58] Field of Search .................. 5/490, 501, 487, 484, 5/434, 496, 482, 436, 473, 502, 500; 297/220, 224

[56] References Cited

U.S. PATENT DOCUMENTS

| | | | |
|---|---|---|---|
| 2,620,494 | 12/1952 | Kay | 5/501 |
| 2,660,735 | 12/1953 | Baum | 5/484 |
| 3,423,774 | 1/1969 | Streetman | 5/490 |
| 3,602,928 | 9/1971 | Heltzer | 5/490 |
| 4,330,892 | 5/1982 | Fukushima | 5/490 |

FOREIGN PATENT DOCUMENTS

| | | | |
|---|---|---|---|
| 2356949 | 5/1975 | Fed. Rep. of Germany | 5/484 |
| 2918041 | 11/1980 | Fed. Rep. of Germany | 297/220 |
| 418482 | 10/1934 | United Kingdom | 5/484 |
| 1546904 | 5/1979 | United Kingdom | 5/496 |

*Primary Examiner*—Alexander Grosz
*Attorney, Agent, or Firm*—Jerome J. Norris

[57] ABSTRACT

A head mat which allows maintenance of the curl hair style without a bonnet and prevents soiling of pillowcases from oils and greases used to produce curl style.

2 Claims, 1 Drawing Figure

HEADMAT

BACKGROUND OF THE INVENTION

Wearers of modern hairstyles known as the "curl," which is a form of permanent waving that employs water base products that contain oils, greases and moisturizers, use some form of bonnet during rest to maintain the hair style.

FIELD OF THE INVENTION

The invention relates to means for maintaining the curl hair style without a bonnet, while preventing soiling of pillow cases from oils, greases, activators and moisturizers used in creating the hairstyle.

SUMMARY OF THE INVENTION

One object of the invention is to provide a machine-washable headmat for maintenance of the curl hair style without a bonnet, while preventing soiling of pillowcases from oils, greases, activators and moisturizers used in creating the hairstyle.

Another object of the invention is to provide a machine-washable, three-layered, moisture proof, cushioned headmat, that allows maintenance of the curl hairstyle without a bonnet, wherein the upper layer has a smoothness which repels some moisture and keeps some moisture in the hair to assist in maintenance of the hair style.

A yet further object of the invention is to provide a machine-washable, three-layered head mat for maintenance of the curl hair style without a bonnet, wherein low friction will exist between the upper layer and curl hair, so as to cause less wear on each strand of hair.

The foregoing and other objects of the invention will be apparent from the description hereinafter set forth.

DETAILED DESCRIPTION OF THE INVENTION

Figure 1:
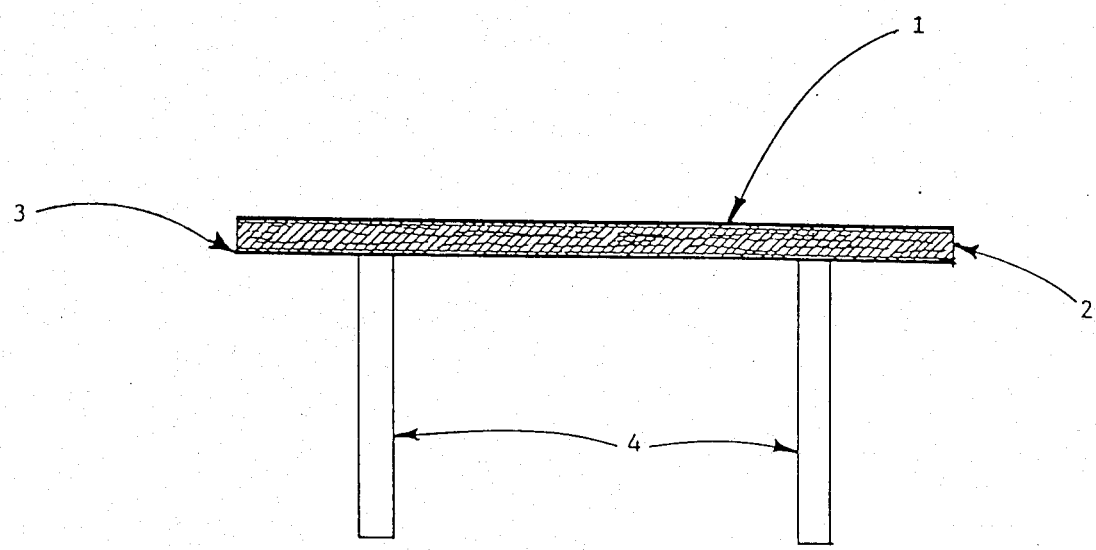
FIG. 1 is a side view of the cushioned head mat.

In the preferred embodiment, which can be better understood by reference to FIG. 1, a three-layered head mat is shown.

Top layer 1, is a polyester material which has been treated with a Zepel fabric fluoridizer. The top layer is a machine-washable polyester, and the Zepel treatment renders it stain resistant and gives it the characteristics to repel some moisture. Also, the smooth nature of the material keeps some moisture in the hair, and this accomodates the moisture needs of hairstyles like the "cold wave," which needs products known as moisturizers and activators. Further, the texture of the top layer is smooth, and this tends to lessen friction between it and the hair, and therefore encourages good health of the hair.

Center layer 2, is composed of a machine-washable polyester matting of ¼ inches in thickness, and serves to cushion the structure, which can be rectangular in shape.

Bottom layer 3, is made of a rubberized flannelette material. This moisture proof bottom layer is textured to compliment the material it is used or placed against. For example, the moisture proof rubberized flannelette material has a minimal amount of noise factor, which accents comfort, when used.

The top, center and bottom layers are stitched together with a polyester thread, and when the head mat is placed on a pillowcase-enclosed pillow, the hairstyle can be maintained without a bonnet. This aids the health of the scalp by keeping the scalp exposed to the proper ventilation, and also allows less friction on the hair, when it is moved across the top layer polyester material, which is treated with Zepel fabric fluoridizor.

The structural design of the invention headmat makes it convenient to use. For example, the elastic attachment 4, on each side of the mat bottom allows quick usage or placement over a pillowcase, and easy removal from the pillowcase. When the headmat is removed from the pillowcase, the pillowcase is free of stains often left by products used on the hair as well as cosmetics which are left on the face.

Moreover, the quality of the material used in the head mat makes caring for it simple, because the head mat's top layer is stain resistant, and the head mat is machine-washable and tumble dryable in a conventional electric dryer.

Elastic straplike attaching means 4, are stitched to the bottom layer of rubberized flannelette material away from the edges thereof, using regular stitches of a durable polyester thread.

The use of the novel head mat eliminates the need to cover the curl hair style with bonnets, etc., during rest, thereby giving the hair and scalp better ventilation.

What is claimed is:

1. A three-layered, machine-washable, moisture proof, cushioned head mat, which allows maintenance of the curl hair style without a bonnet and prevents soiling of pillowcases caused by cosmetics, oils, greases, activators and moisturizers used in curl permanent waving, and characterized by low friction between its top layer and curl hair, comprising:

a top layer of smooth, low friction polyester material treated with a fabric fluridizor sold under the trademark of ZEPEL, said treated polyester material adapted to repel some moisture, thus keeping it in the hair;

a center polyester matting cushioning layer;

a waterproof bottom layer of a rubberized flannelette material;

said layers being stitched together, said bottom layer having a plurality of elastic, straplike attaching means adapted to removably attach said head mat to a pillowcase to thereby prevent its soiling.

2. A method of maintaining the curl hair style without a bonnet while preventing soiling of pillowcases by curl hair users of cosmetics, oils, greases, activators and moisturizers; comprising, removably placing the head mat of claim 1 on top of a pillowcase to be protected, with the aid of the straplike attaching means.

* * * * *